United States Patent
Carpenter et al.

(10) Patent No.: US 6,931,561 B2
(45) Date of Patent: Aug. 16, 2005

(54) APPARATUS AND METHOD FOR ASYNCHRONOUSLY INTERFACING HIGH-SPEED CLOCK DOMAIN AND LOW-SPEED CLOCK DOMAIN USING A PLURALITY OF STORAGE AND MULTIPLEXER COMPONENTS

(75) Inventors: Gary Dale Carpenter, Pflugerville, TX (US); Tung Nguyen Pham, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 685 days.

(21) Appl. No.: 09/978,357

(22) Filed: Oct. 16, 2001

(65) Prior Publication Data

US 2003/0074593 A1 Apr. 17, 2003

(51) Int. Cl.[7] .............................. G06F 1/12; H04L 7/00
(52) U.S. Cl. ...................... 713/400; 713/500; 713/501; 713/600; 327/145
(58) Field of Search ................................ 713/400, 500, 713/501, 600; 327/145

(56) References Cited

U.S. PATENT DOCUMENTS

| | | | |
|---|---|---|---|
| 5,434,996 A | * | 7/1995 | Bell .......................... 713/400 |
| 6,131,173 A | * | 10/2000 | Meirlevede et al. ........ 714/726 |
| 6,255,869 B1 | * | 7/2001 | Fischer ....................... 327/145 |
| 6,389,567 B2 | * | 5/2002 | Porteners et al. ........... 714/733 |

OTHER PUBLICATIONS

Meirlevede et al., PCT/IB97/01346, Jun. 18, 1998.*

* cited by examiner

*Primary Examiner*—Thomas Lee
*Assistant Examiner*—Mark Connolly
(74) *Attorney, Agent, or Firm*—Carr LLP; Diana R. Gerhardt (57) ABSTRACT

Interfacing circuitry for asynchronously transferring data between a high-speed clock domain and a low-speed clock domain is provided. The interfacing circuitry is divided into halves, with one half being synchronized to a first clock and the second half being synchronized to a second clock. The first half and the second half are mirror images of each other. Each half has at least one storage component, such as a register and a flip-flop, for storing a valid bit as well as data, and at least one multiplexer component for gating the storage component. The valid bit is used to control the multiplexer at a receiving half. When transferring from a high-speed clock domain to a low-speed clock domain, the high-speed clock domain may probe the received data and/or the valid bit stored in the low-speed clock domain before the high-speed clock domain sends additional data.

20 Claims, 3 Drawing Sheets

APPARATUS AND METHOD FOR ASYNCHRONOUSLY INTERFACING HIGH-SPEED CLOCK DOMAIN AND LOW-SPEED CLOCK DOMAIN USING A PLURALITY OF STORAGE AND MULTIPLEXER COMPONENTS

BACKGROUND OF THE INVENTION

1. Field of the Invention

The invention relates generally to interfacing circuitry and technique and, more particularly, to asynchronous data transfer between two different clock domains.

2. Description of the Related Art

In an ideal world, all devices communicating with one another would be synchronized to one clock, so that no timing problems occur in such communications. In a real world, however, this is not always possible. Many different devices communicating with one another reside in different clock domains, meaning that they are synchronized to different clocks with different frequencies. Even in a simple computer system, many different components thereof reside in different clock domains. For example, a CPU could be operating at a much higher frequency than other components in the system with which the CPU is communicating.

Whenever two devices reside in two different clock domains, the two devices can communicate either asynchronously or synchronously. In a synchronous approach, the clocks in the two domains are synchronized to a third clock domain.

Asynchronous data transfer between two different clock domains could introduce potential problems such as data mis-sampling. For example, when a high speed device configuration register (DCR) operating at 200 MHz or faster transfers data to and/or from an extremely low speed peripheral device such as an interface to a serial erasable programmable read-only memory (SEPROM) operating at 32 KHz or slower, there could be potential problems such as data mis-sampling.

One possible solution is to implement an interlock mechanism. For example, data acknowledgement may be used to notify the devices in communication of timing information on a read/write process. However, if a timeout mechanism in the data-acknowledge polling system exists and the frequency ratio between the two domains is too large, there could be a potential timeout in the acknowledge polling process and the communication between the two domains would be lost.

Therefore, there is a need for access management to coordinate data transfer between two clock domains without causing a timeout no matter how different the two frequencies in the clock domains are.

SUMMARY OF THE INVENTION

The present invention provides interfacing circuitry for transferring data from a first domain to a second domain, wherein the first domain is synchronized to a first clock and the second domain is synchronized to a second clock.

In one embodiment of the invention, the interfacing circuitry includes a first storage component configured for temporarily storing one or more data bits and a valid bit. The first storage component is synchronized to the first clock.

A first multiplexer component is connected to the first storage component for providing one or more data bits and a valid bit thereto and for receiving one or more data bits and a valid bit therefrom. Also, the first multiplexer is coupled to the first domain for receiving one or more data bits and a valid bit therefrom, and is controlled by a first Write_enable signal from the first domain. Here, the first Write_enable signal determines whether the first storage component keeps its current data and valid bit or latches in a new data and a new valid bit.

The interfacing circuitry also includes a second storage component configured for temporarily storing one or more data bits and a valid bit. The second storage component is synchronized to the second clock.

Additionally, a second multiplexer component is connected to the second storage component for providing one or more data bits and a valid bit thereto and for receiving one or more data bits and a valid bit therefrom. Also, the second multiplexer is coupled to the first storage component for receiving one or more data bits and a valid bit therefrom, and is controlled by a second Write_enable signal from the second domain. Here, the second Write_enable signal determines whether the first storage component keeps its current data and valid bit or latches in a new data and a new valid bit.

In another embodiment of the invention, separate multiplexers may be used for separately handling one or more data bits and a valid bit. The interfacing circuitry includes a first storage component configured for temporarily storing one or more data bits and a valid bit. The first storage component is synchronized to the first clock.

A first multiplexer component is connected to the first storage component for providing one or more data bits thereto and for receiving one or more data bits therefrom. Also, the first multiplexer component is coupled to the first domain for receiving one or more data bits therefrom, and is controlled by a first Write_enable signal from the first domain. Here, the first Write_enable signal determines whether the first storage component keeps its current data or latches in a new data.

Similarly, a second multiplexer component is connected to the first storage component for providing a valid bit thereto and for receiving a valid bit therefrom, is coupled to the first domain for receiving a valid bit therefrom, and is controlled by the first Write_enable signal from the first domain. Here, the first Write_enable signal determines whether the first storage component keeps its current data or latches in a new data.

The interfacing circuitry also includes a second storage component configured for temporarily storing one or more data bits and a valid bit. The second storage component is synchronized to the second clock.

A third multiplexer component is connected to the second storage component for providing one or more data bits thereto and for receiving one or more data bits therefrom, is coupled to the first storage component for receiving one or more data bits therefrom, and is controlled by a second Write_enable signal from the second domain. Here, the second Write_enable signal determines whether the first storage component keeps its current data or latches in a new data.

Similarly, a fourth multiplexer component is connected to the second storage component for providing a valid bit thereto and for receiving a valid bit therefrom, is coupled to the first storage component for receiving a valid bit therefrom, and is controlled by a second Write_enable signal from the second domain. Here, the second Write_enable signal determines whether the first storage component keeps its current valid bit or latches in a new valid bit.

In still another embodiment of the invention, a method is provided for asynchronously transferring data from a first domain to a second domain. As mentioned above, the first domain is synchronized to a first clock and the second domain is synchronized to a second clock. The method comprises the following steps: receiving one or more data bits and a valid bit from the first domain; temporarily storing the one or more data bits and the valid bit in the first domain; waiting for the valid bit to be asserted; latching in the one or more data bits to the second domain within one cycle of the second clock after valid bit is asserted; and temporarily storing the one or more bits and the valid bit in the second domain.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

Figure 1:
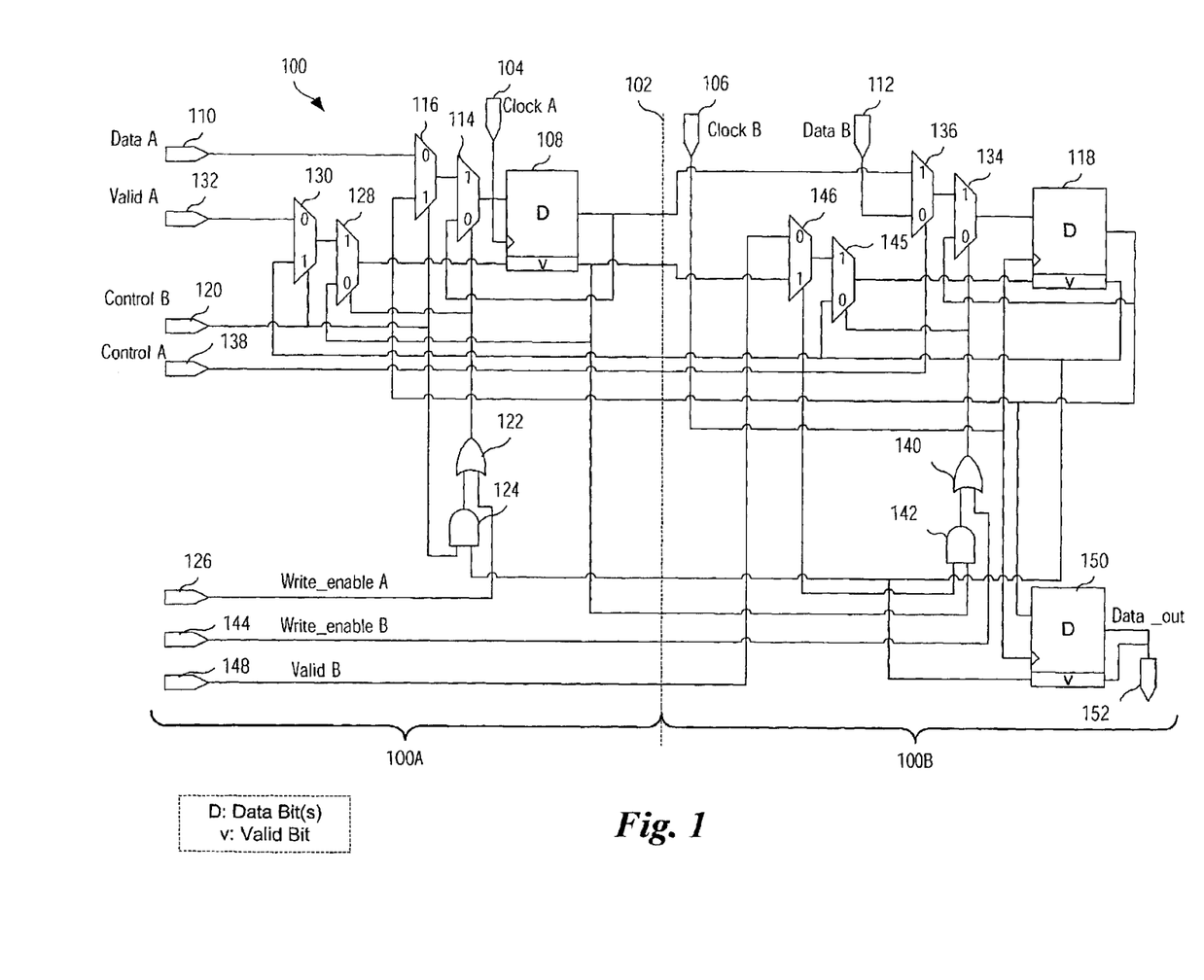
FIG. 1 depicts a block diagram illustrating features of one embodiment of the invention.
Figure 2:
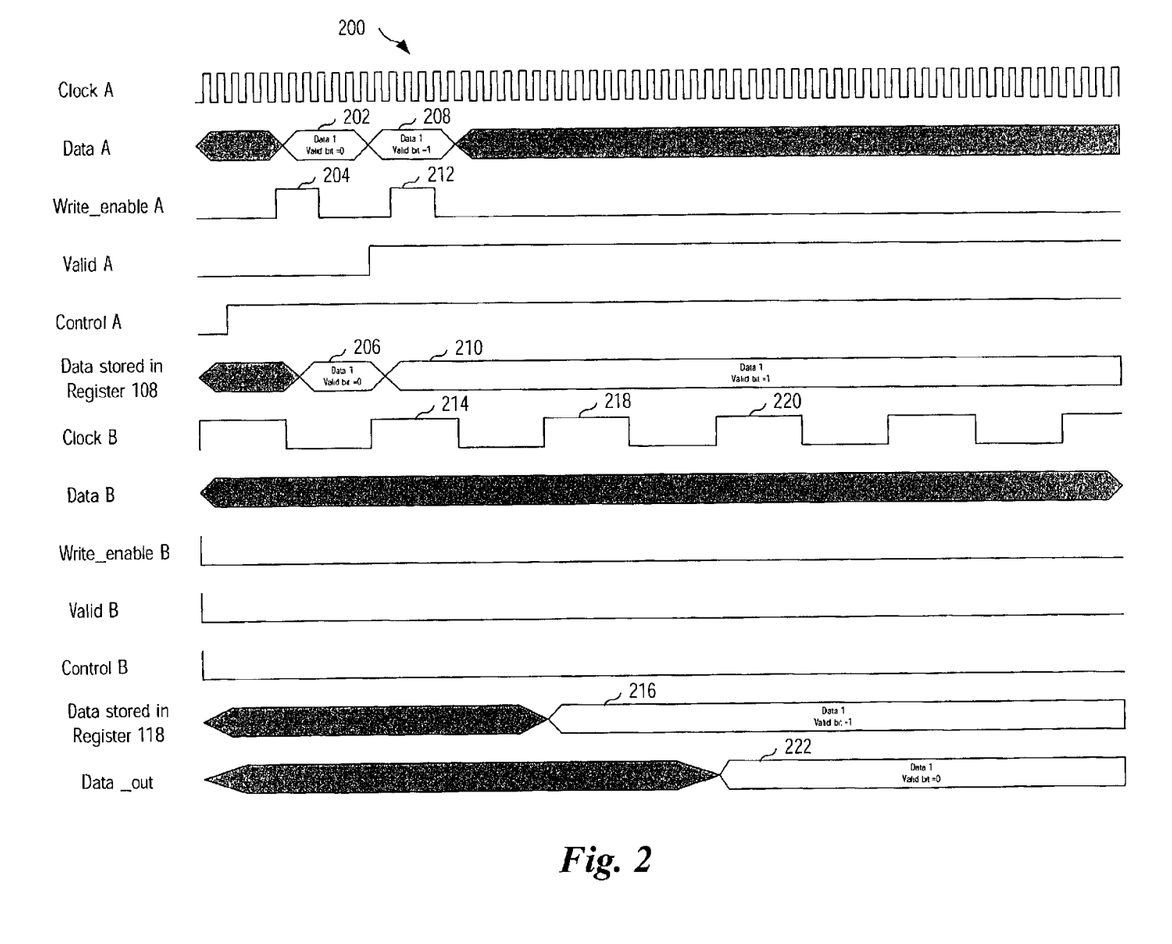
FIG. 2 depicts a timing diagram illustrating an exemplary data transfer from a high speed domain to a low speed domain in the block diagram as shown in FIG. 1.
Figure 3:
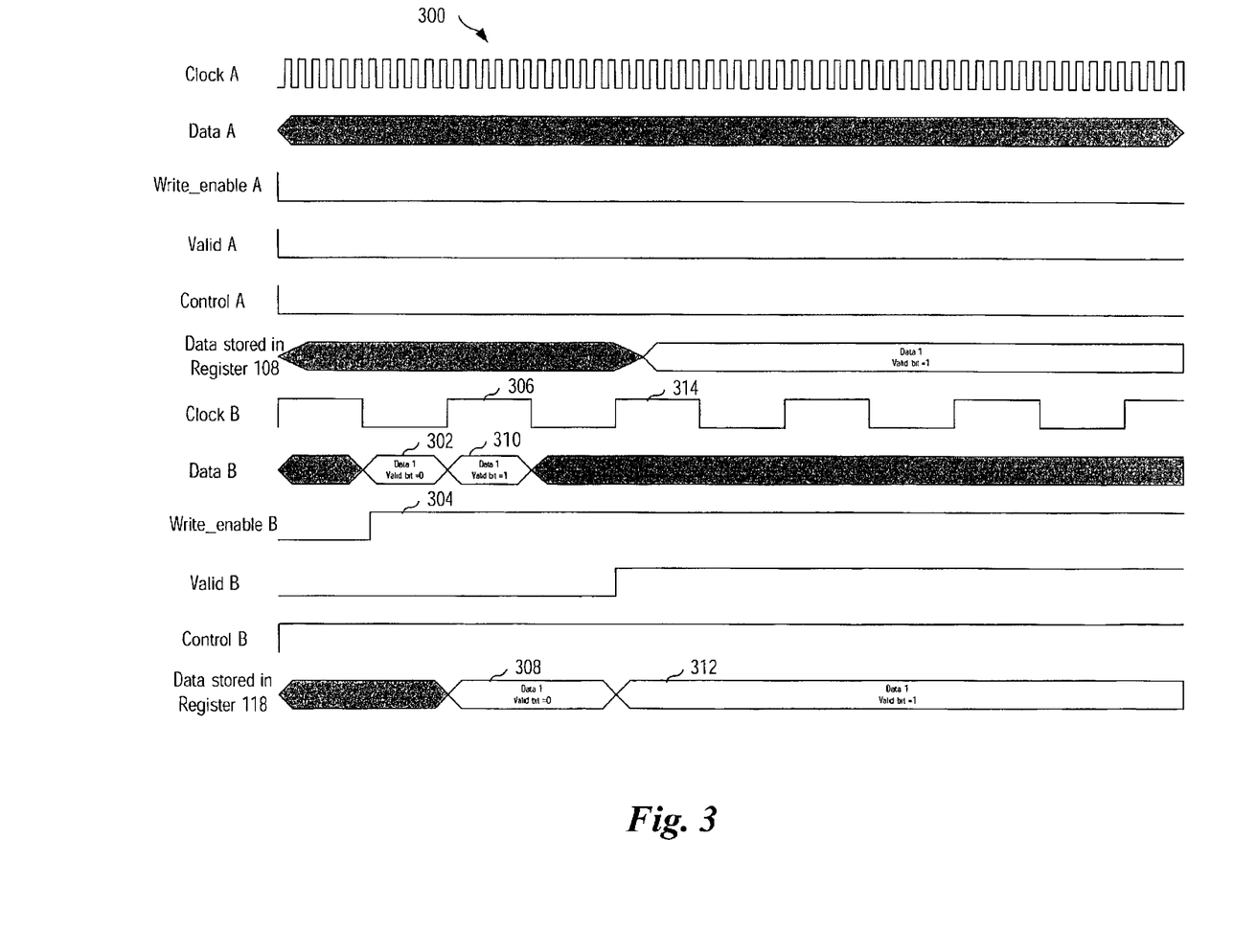
FIG. 3 depicts a timing diagram illustrating an exemplary data transfer from a high speed domain to a low speed domain in the block diagram as shown in FIG. 1.

The principles of the present invention and their advantages are best understood by referring to the illustrated operations of embodiment depicted in FIGS. 1–3.

In FIG. 1, a reference numeral 100 designates an interfacing circuitry as one embodiment of the present invention. The interfacing circuitry 100 is divided into a first half 100a and a second half 100b with a synchronous boundary 102. The first half 100a is controlled by a Clock A signal from an input port 104, whereas the second half 100b is controlled by a Clock B signal from an input port 106. A domain A is controlled by the Clock A, whereas a domain B is controlled by the Clock B. It is assumed herein that the domain A is a high speed domain and that the domain B is a low speed domain. For example, the domain A may comprise a high speed device configuration register (DCR) which operates at 200 KHz or faster, whereas the domain B may comprise a low speed peripheral device such as an interface to a serial erasable programmable read-only memory (SEPROM) which operates 32 KHz or slower.

The Clock A signal is a clock signal from the domain A at a frequency equivalent to that of an interfacing device (not shown) in the domain A capable of read and write operations. Likewise, the Clock B signal is a clock signal from the domain B at a frequency equivalent to that of an interfacing device (not shown) in the domain B.

In the embodiment shown in FIG. 1, the first half 100a of the interfacing circuitry 100 includes a register 108 for storing data such as data bit(s) carried by a Data A signal and a Data B signal. The data bit(s) carried by the Data A signal are transferred from the domain A to the domain B. Similarly, the data bit(s) carried by the Data B signal are transferred from the domain B to the domain A. Additionally, the register 108 is configured to store a valid bit. The register 108 represents any type of a storage component including a latch. The Data A signal is input from an input port 110, whereas the Data B signal is input from an input port 112. The input port 110 represents a write port in the aforementioned interfacing device in the domain A, whereas the input port 112 represents a write port in the aforementioned interfacing device in the domain B. The register 108 is synchronized to the Clock A, and is connected to a 2-to-1 multiplexer 114 for receiving a data input therefrom. The multiplexer 114 is connected to a multiplexer 116 for receiving one input from either the input port 110 or a register 118. Similar to the register 108, the register 118 is configured to store data such as data bit(s) carried by the Data A signal and the Data B signal and a valid bit. The register 118 represents any type of a storage component including a latch. The multiplexer 114 is also connected to the register 108 for receiving a data output therefrom. Therefore, the register 108 receives the Data A signal, an output data of the register 108, or an output data of the register 118, depending on the control signals applied to the multiplexers 114 and 116. The multiplexer 116 is controlled by a Control B signal, which is input from an input port 120.

The Control B signal is a control signal from a master arbiter (not shown) telling the interfacing circuitry 100 that the domain B is in control, and enabling the domain A to update information from the domain B. Preferably, the master arbiter is a controlling logic for determining which stage of the process the whole system is in and enabling one domain to be the active domain. The master arbiter may be driven from the Clock A signal or other clocks preferably faster than the Clock A signal. As shown in FIG. 1, the multiplexer 116 is configured to output an output data of the register 118 when the Control B signal is a logical 1, and is configured to output the Data A signal when the Control B signal is a logical 0.

The multiplexer 114 is controlled by an output signal of an OR gate 122. The OR gate 122 is connected to an AND gate 124 for receiving an AND logic signal of the Control B signal and a valid bit stored in the register 118. The OR gate 122 is also connected to an input port 126 for receiving a Write_enable A signal from the domain A. The Write enable A signal is a control signal from the domain A to enable the domain A to latch a new data in the register 108. Preferably, the Write_enable A signal is provided by a state machine residing in the domain A. Along with the Control B signal, the Write_enable A signal determines whether the register 108 should keep its current data or latch in a new data. In case the domain A is active and a state machine (not shown) in the domain A determines to record a new data, then the Write_enable A signal is asserted. In case the domain B is active, then the register 108 should latch in a new data all the time, provided that the valid bit from the register 118 is asserted.) The AND gate 124 is connected to the input port 120 for receiving the Control B signal, and to the register 118 for receiving a valid bit stored in the register 118. The multiplexer 114 is configured to output an output signal of the multiplexer 116 when the output signal of the OR gate 122 is a logical 1, and is configured to output an output data of the register 108 when the output signal of the OR gate 122 is a logical 0.

The register 108 is also connected to a multiplexer 128 for receiving a valid bit therefrom. The multiplexer 128 is connected to a multiplexer 130 for receiving an output signal of the multiplexer 130, and is connected to the register 108 for receiving a valid bit stored therein. The multiplexer 128 is controlled by the output signal of the OR gate 122. The multiplexer 128 is configured to output the output signal of the multiplexer 130 when the output signal of the OR gate 122 is a logical 1, and is configured to output the valid bit stored in the register 108 when the output signal of the OR gate 122 is a logical 0.

The multiplexer 130 is connected to an input port 132 for receiving a Valid A signal, and to the register 118 for receiving a valid bit stored therein. Preferably, the Valid A signal is provided by a state machine residing in the domain A. The multiplexer 130 is controlled by the Control B signal. The multiplexer 130 is configured to output the Valid A signal when the Control B signal is a logical 0, and is configured to output the valid bit stored in the register 118 when the Control B signal is a logical 1. The valid A signal is active only while domain A is in control.

The second half 100b of the interfacing circuitry 100 includes the register 118 connected to a multiplexer 134 for storing data such as data bit(s) carried by the Data A signal and the Data B signal. As mentioned above, the Data A signal is input from the input port 108 from the domain A, whereas the Data B signal is input from the input port 110 from the domain B. The register 118 is synchronized to the Clock B.

The multiplexer 134 is connected to a multiplexer 136 for receiving one input from either the input port 112 or the register 108. The multiplexer 134 is also connected to the register 118 for receiving a data output therefrom. Therefore, the register 118 receives one of the Data B signal, an output data of the register 108, and an output data of the register 118, depending on the control signals applied to the multiplexers 134 and 136. The multiplexer 136 is controlled by a Control A signal, which is input from an input port 138.

The Control A signal is a control signal from a master arbiter (not shown) telling the interfacing circuitry 100b that the domain A is in control, and enabling the domain B to update information from the domain A. Preferably, the master arbiter is a controlling logic for determining which stage of the process the whole system is in and enabling one domain to be the active domain. The master arbiter may be driven from the Clock A signal or other clocks preferably faster than the Clock A signal. As shown in FIG. 1, the multiplexer 136 is configured to output an output data of the register 108 when the Control A signal is a logical 1, and is configured to output the Data B signal when the Control A signal is a logical 0.

The multiplexer 134 is controlled by an output signal of an OR gate 140. The OR gate 140 is connected to an AND gate 142 for receiving an AND logic signal of the Control A signal and a valid bit stored in the register 108. The OR gate 140 is also connected to an input port 144 for receiving a Write_enable B signal from the domain B. Preferably, the Write enable B signal is provided by a state machine residing in the domain B. The AND gate 142 is connected to the input port 138 for receiving the Control A signal, and to the register 108 for receiving a valid bit stored in the register 108. The multiplexer 134 is configured to output an output signal of the multiplexer 136 when the output signal of the OR gate 142 is a logical 1, and is configured to output an output data of the register 118 when the output signal of the OR gate 122 is a logical 0.

The multiplexer 145 is connected to a multiplexer 146 for receiving an output signal of the multiplexer 146, and is connected to the register 118 for receiving a valid bit stored therein. The multiplexer 145 is controlled by the output signal of the OR gate 140. The multiplexer 145 is configured to output the output signal of the multiplexer 146 when the output signal of the OR gate 140 is a logical 1, and is configured to output the valid bit stored in the register 118 when the output signal of the OR gate 140 is a logical 0.

The multiplexer 146 is connected to an input port 148 for receiving a Valid B signal, and to the register 108 for receiving a valid bit stored therein. Preferably, the Valid B signal is provided by a state machine residing in the domain B. The multiplexer 146 is controlled by the Control A signal. The multiplexer 146 is configured to output the Valid B signal when the Control A signal is a logical 0, and is configured to output the valid bit stored in the register 108 when the Control A signal is a logical 1. The valid B signal is active only while domain B is in control.

The second half 100b also includes a register 150. The register 150 is connected to the register 118 to store the same data bit(s) and the same valid bit after one cycle of the Clock B. A Data_out signal carrying the data bit(s) and the valid bit are output to an output port 152. The output port 152 is probed in the domain A. Alternatively, the register 150 may be implemented in other part of the domain B than the second half 100b.

As clearly shown in FIG. 1, the interfacing circuitry 100 has a mirror latching mechanism. That is, the register 108 is a mirror image of the register 118, and vice versa, to allow data transmitted from the domain A to the domain B to be written in the register 118 without experiencing mis-sampling and/or other side effects of communications between two domains having different clock speeds. Therefore, the embodiment as shown in FIG. 1 solves the problem of transferring data from a high frequency domain to a low frequency domain.

As mentioned above, the Data A signal carries data bits to be transmitted from the domain A to the domain B. The Data A signal is first stored in the register 108 if the control signals of the multiplexers 116 and 114 are a logical 0 and a logical 1, respectively. This occurs when the Control B signal is a logical 0 and the output signal of the OR gate 122 is a logical 1. As mentioned above, the Control B signal is a control signal from a master arbiter (not shown) telling the interfacing circuitry 100 that the domain B is in control, and enabling the domain A to update information from the domain B. Therefore, the Control B signal is a logical 0 throughout the procedure of transferring data from the domain A to the domain B. Accordingly, the output of the AND gate 124 is a logical 0, regardless of the logical state of the valid bit stored in the register 118 at this time. This makes sense because the valid bit stored in the register 118 at this time should not affect the procedure.

Now that one input to the OR gate 122 is a logical 0, the other input thereto determines the output therefrom, which is used to control the multiplexer 114. The other input to the OR gate 122 is the Write_enable A signal. As mentioned above, the Write_enable A signal enables the domain A to latch a new data in the register 108. In FIG. 1, it is clear that the Write_enable A determines whether the register 118 should keep its current data or latch in a new data by controlling the multiplexer 114. Therefore, when the Write_enable A signal is asserted for a duration of more than one cycle of the Clock A signal, a new data is latched in the register 108 through the Data A signal via the input port 110.

The pair of the multiplexers 130 and 128 are controlled by the same control signals as in the pair of the multiplexers 116 and 114. Instead of the Data A signal input to the multiplexer 116, the Valid A signal is input to the multiplexer 130. Since the multiplexers 130 and 128 are similarly connected to each other and to the register 118 as the multiplexers 116 and 114, the Write_enable A signal determines whether the register 118 should keep its current valid bit or latch in a new valid bit by controlling the multiplexer 128. Therefore, when the Write_enable A signal is asserted for a duration of more than one cycle of the Clock A signal, a new valid bit is latched in the register 108 through the Valid A signal via the input port 132.

Assuming that the Write_enable A signal is asserted for at least one cycle of the Clock A signal, a new data is latched in the register 108 and the domain A is in control. This newly latched data is fed to the multiplexer 136. Since the Control A signal is asserted when data is being transferred from the domain A to the domain B, the data is input to the multiplexer 134. The output of the OR gate 140 determines whether the register 118 should keep its current data or latch in a new data by controlling the multiplexer 134. Now that the Write_enable B signal cannot be asserted during this phase, the output of the AND gate 142 must be a logical 1 in order to latch in a new data in the register 118. Since the Control A signal is always asserted, the valid bit stored in the register 108 determines whether the register 118 keeps its current data or latches in a new data by controlling the multiplexer 134. Therefore, when a new valid bit of a logical 1 is latched in the register 108, the register 118 latches in the new data stored in the register 108 at the next rising edge of the Clock B signal. The valid bit stored in the register 108 is also input to the multiplexer 146. Since the Control A signal is always asserted, this valid bit will be input to the register 118 at the next rising edge of the Clock B signal. It is noted herein that the registers 108, 118 and 150 could sample data either in rising or falling edge of a clock signal applied thereto, depending on specific types of the registers used, without departing from the true spirit of the invention.

The register 150 will latch in the data and the valid bit stored in the register 118 after one cycle of the Clock B signal. The data and valid bit will be output to the output port 152 as the Data_out signal. Preferably, the Data_out signal is probed from the domain A to confirm whether a correct data is transferred from the domain A to the domain B. Preferably, this confirmation determines whether the domain B is ready for another data transfer.

In case of transferring data from a low frequency domain such as the domain B to a high frequency domain such as the domain A, such data transfer is not problematic provided that a read process at the high frequency domain has the capability of polling for a valid bit from the low frequency domain. The register 118 transmits a valid bit to the domain A to control the multiplexer 114. Since a data is transferred from the domain B to the domain A, the Control B signal is always asserted and the Write_enable A signal is always deasserted. Thus, a valid bit in the register 118 determines whether the register 108 keeps its current data or latches in a new data at the next Clock A pulse. Therefore, the read process at the domain A has the capability of polling for a valid bit from the domain B.

The circuit configuration of the interfacing circuitry 100 may be varied without departing from the true spirit of the invention. For example, the first half 100a may have only two multiplexers instead of four by merging the multiplexers 114 and 116 with the multiplexers 128 and 130, respectively. That is, a first multiplexer (not shown) may replace both the multiplexers 114 and 128, and a second multiplexer (not shown) may replace both the multiplexers 116 and 130. In this case, the first multiplexer is connected to the register 108 for outputting data and a valid bit thereto, to the second multiplexer for receiving an output therefrom, and to the register 108 for receiving data and a valid bit stored therein. The first multiplexer is controlled by the output signal of the OR gate 122. The second multiplexer is connected to a first combined input port (not shown) for receiving both the Data A signal and the Valid A signal therefrom, and to the register 118 for receiving data and a valid bit stored therein. The second multiplexer is controlled by the Control B signal.

Similarly, the second half 100b may have only two multiplexers instead of four by merging the multiplexers 134 and 136 with the multiplexers 145 and 146, respectively. That is, a third multiplexer (not shown) may replace both the multiplexers 134 and 145, and a fourth multiplexer (not shown) may replace both the multiplexers 136 and 146. In this case, the third multiplexer is connected to the register 118 for outputting data and a valid bit thereto, to the fourth multiplexer for receiving an output therefrom, and to the register 118 for receiving data and a valid bit stored therein. The third multiplexer is controlled by the output signal of the OR gate 140. The fourth multiplexer is connected to a second combined input port (not shown) for receiving both the Data B signal and the Valid B signal, and to the register 108 for receiving data and a valid bit stored therein. The fourth multiplexer is controlled by the Control A signal.

Now referring to FIG. 2, a timing diagram 200 is shown to illustrate exemplary signals applied to the interfacing circuitry 100 of FIG. 1, when data is transferred from the domain A to the domain B. As mentioned above, the Control B signal is always deasserted while data is transferred from the domain A to the domain B. Thus, the Write_enable A signal takes an exclusive control of the multiplexer 114. A data block 202 of the Data A signal represents a state in which a Data 1 and a valid bit of a logical 0 are input from the input port 110 of FIG. 1. Thus, the data block 202 is latched in by the register 108 at a pulse 204 of the Write_enable A signal. One cycle of the A Clock signal after the rising edge of the pulse 204, the register 108 stores a data block 206.

After data acknowledgement from the register 108, a data block 208 is input to the input port 110 with a valid bit asserted. The data block 208 is written to the register 108 as a data block 210 at the rising edge of a first A clock pulse during a pulse 212 of the Write_enable A signal. A data block 216 is written to the register 118 at the rising edge of a next pulse 218 of the Clock B signal. At the rising edge of a next pulse 220 of the Clock B signal, the data block 216 is sampled at the register 150 as a data block 222.

After data acknowledgement from the register 118, an interfacing device (not shown) in the domain A for reading and/or writing data reads back the content of the register 118 by probing the output port 152. For example, such an interfacing device may be a high speed CPU device configuration interface. Since the register 150 stores the same data and valid bit as the register 118 after one cycle of the Clock B signal, it is then determined whether data has been transferred from the domain A to the domain B and has been updated for at least one cycle of the Clock B signal successfully. Probing the content of the register 150 rather than that of the register 118 is important in that it verifies whether the data is updated in an interfacing device (not shown in FIG. 1) in the domain B.

In FIG. 3, a timing diagram 300 is shown to illustrate exemplary signals shown in FIG. 1, when data is transferred from the domain B to the domain A. In this case, the Data A signal does not change or affect the functionality of the circuit, because the Control B and Control A signals gate it off. The Write_enable A signal is deasserted during this state of operation, since the domain B is in control at this time. A valid bit stored in the register 108 is not important anymore in this state of operation.

A Data 1 is input from the input port 112 and passes through the multiplexer 136 since the Control A signal is deasserted. Also, a valid bit of a logical 0 is input from the input port 148, and passes through the multiplexer 146, since the Control A signal is a logical 0. A data block 302 is shown as a first data block including the Data 1 and valid bit of 0. As mentioned above, the multiplexer 134 is controlled by the Write_enable B signal, since the output of the AND gate 142 is a logical 0. Once the Write_enable B is asserted as shown in a pulse 304, a data block 308 is recorded into the register 118 at the rising edge of a next pulse 306 of the Clock B signal. A next data block 310 with a valid bit of a logical 1 is shown to be recorded into the register 118 as a data block 312.

Since the Write_enable A signal is a logical 0, the output of the OR gate 122 is equal to the valid bit stored in the register 118. At the rising edge of the pulse 306 of the Clock B signal, the valid bit is a logical 0. Thus, the register 108 keeps its current data during until a next pulse 314 of the Clock B signal. At the rising edge of the pulse 314, the valid bit stored in the register 118 is a logical 1. Therefore, the multiplexer 114 outputs the Data 1 stored in the register 118 to the register 108, and the register 108 latches in the Data 1. Similarly, the multiplexer 128 outputs the valid bit stored in the register 118 to the register 108, since the same output of the OR gate 122 controls the multiplexer 128. Accordingly, the register 108 latches in the Data 1 and the valid bit of a logical 1 at the rising edge of the pulse 314 of the Clock B signal. The valid bit stored in the register 108, an interfacing device in the domain A in charge of read and/or write operations shows an interfacing device in the domain A in charge of read/write operations that the Data 1 stored in the register 104 is now a valid data transferred from the domain B.

It will be understood from the foregoing description that various modifications and changes may be made in the preferred embodiment of the present invention without departing from its true spirit. This description is intended for purposes of illustration only and should not be construed in a limiting sense. The scope of this invention should be limited only by the language of the following claims.

What is claimed is:

1. Interfacing circuitry for transferring data from a first domain to a second domain, wherein the first domain is synchronized to a first clock and the second domain is synchronized to a second clock, the interfacing circuitry comprising:

a first storage component configured for temporarily storing one or more data bits and a valid bit, the first storage component being synchronized to the first clock;

a first multiplexer component connected to the first storage component for providing one or more data bits and a valid bit thereto and for receiving one or more data bits and a valid bit therefrom, coupled to the first domain for receiving one or more data bits and a valid bit therefrom, and controlled by a first Write_enable signal from the first domain, wherein the first Write_enable signal determines whether the first storage component keeps its current data and valid bit or latches in a new data and a new valid bit;

a second storage component configured for temporarily storing one or more data bits and a valid bit, the second storage component being synchronized to the second clock; and a second multiplexer component connected to the second storage component for providing one or more data bits and a valid bit thereto and for receiving one or more data bits and a valid bit therefrom, coupled to the first storage component for receiving one or more data bits and a valid bit therefrom, and controlled by a second Write_enable signal from the second domain, wherein the second Write_enable signal determines whether the second storage component keeps its current data and valid bit or latches in a new data and a new valid bit.

2. The interfacing circuitry of claim 1, wherein the first clock is faster than the second clock.

3. The interfacing circuitry of claim 1, wherein the first clock is faster than the second clock, the interfacing circuitry further comprising:

a third storage component connected to the second storage component for receiving one or more data bits and a valid bit therefrom and coupled to the first domain for providing the one or more data bits and the valid bit thereto, the third storage component being synchronized to the second clock.

4. The interfacing circuitry of claim 1, further comprising:

a third multiplexer component coupled to the second domain for receiving one or more data bits and a valid bit therefrom, connected to the first storage component for receiving one or more data bits and a valid bit therefrom, connected to the second multiplexer component for outputting one or more data bits and a valid bit thereto, and controlled by a first Control signal, the first Control signal determining whether data and a valid bit are transferred from the first domain to the second domain or from the second domain to the first domain, the first Control signal being generated by a master arbiter logic;

a fourth multiplexer component coupled to the first domain for receiving one or more data bits and a valid bit therefrom, connected to the second storage component for receiving one or more data bits and a valid bit therefrom, connected to the first multiplexer component for outputting one or more data bits and a valid bit thereto, and controlled by a second Control signal, the second Control signal determining whether data and a valid bit are transferred from the first domain to the second domain or from the second domain to the first domain, the second Control signal being generated by the master arbiter logic;

a first AND gate connected to the master arbiter logic for receiving the second Control signal, and connected to the second storage component for receiving a valid bit therefrom;

a first OR gate connected to the first AND gate for receiving an output signal therefrom, coupled to the first domain for receiving the first Write_enable signal, and connected to the first multiplexer component for providing a control signal thereto;

a second AND gate connected to the master arbiter logic for receiving the first Control signal, and connected to the first storage component for receiving a valid bit therefrom; and a second OR gate connected to the second AND gate for receiving an output signal therefrom, coupled to the second domain for receiving the second Write_enable signal, and connected to the second multiplexer component for providing a control signal thereto.

5. The interfacing circuitry of claim 1, wherein the first clock is faster than the second clock, the interfacing circuitry further comprising:

a third storage component connected to the second storage component for receiving one or more data bits and a valid bit therefrom and coupled to the first domain for providing the one or more data bits and the valid bit thereto, the third storage component being synchronized to the second clock;

a third multiplexer component coupled to the second domain for receiving one or more data bits and a valid bit therefrom, connected to the first storage component for receiving one or more data bits and a valid bit therefrom, connected to the second multiplexer component for outputting one or more data bits and a valid bit thereto, and controlled by a first Control signal, the first Control signal determining whether data and a valid bit are transferred from the first domain to the second domain or from the second domain to the first domain, the first Control signal being generated by a master arbiter logic;

a fourth multiplexer component coupled to the first domain for receiving one or more data bits and a valid bit therefrom, connected to the second storage component for receiving one or more data bits and a valid bit therefrom, connected to the first multiplexer component for outputting one or more data bits and a valid bit thereto, and controlled by a second Control signal, the second Control signal determining whether data and a valid bit are transferred from the first domain to the second domain or from the second domain to the first domain, the second Control signal being generated by the master arbiter logic;

a first AND gate connected to the master arbiter logic for receiving the second Control signal, and connected to the second storage component for receiving a valid bit therefrom;

a first OR gate connected to the first AND gate for receiving an output signal therefrom, coupled to the first domain for receiving the first Write_enable signal, and connected to the first multiplexer component for providing a control signal thereto;

a second AND gate connected to the master arbiter logic for receiving the first Control signal, and connected to the first storage component for receiving a valid bit therefrom; and a second OR gate connected to the second AND gate for receiving an output signal therefrom, coupled to the second domain for receiving the second Write_enable signal, and connected to the second multiplexer component for providing a control signal thereto.

6. The interfacing circuitry of claim 1, wherein the first multiplexer component comprises:

a third multiplexer component connected to the first storage component for providing one or more data bits thereto and receiving one or more data bits therefrom, coupled to the first domain for receiving one or more data bits therefrom, and controlled by the first Write_enable signal from the first domain, wherein the first Write_enable signal determines whether the first storage component keeps its current data or latches in a new data; and a fourth multiplexer component connected to the second storage component for receiving a valid bit therefrom and for providing a valid bit to the first storage component, coupled to the second domain for receiving a valid bit therefrom, and controlled by a second control signal from the second domain, wherein the second control signal selects between the first storage component valid bit or a new valid bit.

7. The interfacing circuitry of claim 6, wherein the third multiplexer is configured to output the one or more data bits received from the first storage component when the valid bit received from the first storage component is asserted.

8. The interfacing circuitry of claim 7, wherein the first clock is faster than the second clock.

9. The interfacing circuitry of claim 1, wherein the second clock is faster than the first clock.

10. The interfacing circuitry of claim 1, wherein the first storage component and the second storage component are registers.

11. The interfacing circuitry of claim 1, wherein the first storage component and the second storage component are flip-flops.

12. The interfacing circuitry of claim 1, wherein the first multiplexer is configured to output the one or more bits received from the first domain when the first Write_enable signal is asserted.

13. Interfacing circuitry for transferring data from a first domain to a second domain, wherein the first domain is synchronized to a first clock and the second domain is synchronized to a second clock, the interfacing circuitry comprising:

a first storage component configured for temporarily storing one or more data bits and a valid bit, the first storage component being synchronized to the first clock;

a first multiplexer component connected to the first storage component for providing one or more data bits thereto and for receiving one or more data bits therefrom, coupled to the first domain for receiving one or more data bits therefrom, and controlled by a first Write_enable signal from the first domain, wherein the first Write_enable signal determines whether the first storage component keeps its current data or latches in a new data;

a second multiplexer component connected to the first storage component for providing a valid bit thereto and for receiving a valid bit therefrom, coupled to the first domain for receiving a valid bit therefrom, and controlled by the first Write_enable signal from the first domain, wherein the first Write_enable signal determines whether the first storage component keeps its current data or latches in a new data;

a second storage component configured for temporarily storing one or more data bits and a valid bit, the second storage component being synchronized to the second clock;

a third multiplexer component connected to the second storage component for providing one or more data bits thereto and for receiving one or more data bits therefrom, coupled to the first storage component for receiving one or more data bits therefrom, and controlled by a second Write_enable signal from the second domain, wherein the second Write_enable signal determines whether the first storage component keeps its current data or latches in a new data; and a fourth multiplexer component connected to the second storage component for providing a valid bit thereto and for receiving a valid bit therefrom, coupled to the first storage component for receiving a valid bit therefrom, and controlled by a second Write_enable signal from the second domain, wherein the second Write_enable signal determines whether the first storage component keeps its current valid bit or latches in a new valid bit.

14. The interfacing circuitry of claim 13, wherein the first clock is faster than the second clock.

15. The interfacing circuitry of claim 13, wherein the first clock is faster than the second clock, the interfacing circuitry further comprising:

a third storage component connected to the second storage component for receiving one or more data bits and a valid bit therefrom and coupled to the first domain for providing the one or more data bits and the valid bit thereto, the third storage component being synchronized to the second clock.

16. The interfacing circuitry of claim 13, further comprising:

a fifth multiplexer component coupled to the second domain for receiving one or more data bits therefrom, connected to the first storage component for receiving one or more data bits therefrom, connected to the second multiplexer component for outputting one or more data bits thereto, and controlled by a first Control signal, the first Control signal determining whether data and a valid bit are transferred from the first domain to the second domain or from the second domain to the first domain, the first Control signal being generated by a master arbiter logic;

a sixth multiplexer component coupled to the second domain for receiving a valid bit therefrom, connected to the first storage component for receiving a valid bit therefrom, connected to the second multiplexer component for outputting a valid bit thereto, and controlled by a first Control signal, the first Control signal determining whether data and a valid bit are transferred from the first domain to the second domain or from the second domain to the first domain, the first Control signal being generated by a master arbiter logic;

a seventh multiplexer component coupled to the first domain for receiving one or more data bits therefrom, connected to the second storage component for receiving one or more data bits therefrom, connected to the first multiplexer component for outputting one or more data bits thereto, and controlled by a second Control signal, the second Control signal determining whether data is transferred from the first domain to the second domain or from the second domain to the first domain, the second Control signal being generated by the master arbiter logic;

a eighth multiplexer component coupled to the first domain for receiving a valid bit therefrom, connected to the second storage component for receiving a valid bit therefrom, connected to the first multiplexer component for outputting a valid bit thereto, and controlled by a second Control signal, the second Control signal determining whether a valid bit is transferred from the first domain to the second domain or from the second domain to the first domain, the second Control signal being generated by the master arbiter logic;

a first AND gate connected to the master arbiter logic for receiving the second Control signal, and connected to the second storage component for receiving a valid bit therefrom;

a first OR gate connected to the first AND gate for receiving an output signal therefrom, coupled to the first domain for receiving the first Write_enable signal, and connected to the first and second multiplexer components for providing a control signal thereto;

a second AND gate connected to the master arbiter logic for receiving the first Control signal, and connected to the first storage component for receiving a valid bit therefrom; and a second OR gate connected to the second AND gate for receiving an output signal therefrom, coupled to the second domain for receiving the second Write_enable signal, and connected to the third and fourth multiplexer components for providing a control signal thereto.

17. A method for asynchronously transferring data from a first domain to a second domain, wherein the first domain is synchronized to a first clock and the second domain is synchronized to a second clock, the method comprising the steps of:

receiving one or more data bits and a valid bit from the first domain;

temporarily storing the one or more data bits and the valid bit in the first domain;

waiting for the valid bit to be asserted;

latching in the one or more data bits to the second domain within one cycle of the second clock after valid bit is asserted; and temporarily storing the one or more data bits and the valid bit in the second domain.

18. The method of claim 17, further comprising the step of:

storing the one or more bits and the valid bit in the second domain for at least one cycle of the second clock after the valid bit is asserted; and probing the one or more bits and the valid bit from the first domain to confirm the receipt of the one or more data bits and the valid bit by the second domain before transferring a new data from the first domain to the second domain.

19. The method of claim 17, wherein the first clock is faster than the second clock.

20. The method of claim 17, wherein the second clock is faster than the first clock.

* * * * *